United States Patent
Baron

(10) Patent No.: US 9,058,196 B2
(45) Date of Patent: *Jun. 16, 2015

(54) HOST MACHINE LEVEL TEMPLATE CACHING IN VIRTUALIZATION ENVIRONMENTS

(75) Inventor: Ayal Baron, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 210 days.

This patent is subject to a terminal disclaimer.

(21) Appl. No.: 13/085,290

(22) Filed: Apr. 12, 2011

(65) Prior Publication Data

US 2012/0266161 A1 Oct. 18, 2012

(51) Int. Cl.
    *G06F 9/455* (2006.01)
(52) U.S. Cl.
    CPC .. *G06F 9/45558* (2013.01); *G06F 2009/45575* (2013.01)
(58) Field of Classification Search
    None
    See application file for complete search history.

(56) References Cited

U.S. PATENT DOCUMENTS

| 7,325,111 | B1* | 1/2008 | Jiang | 711/162 |
| 8,060,703 | B1* | 11/2011 | Desai et al. | 711/147 |
| 2006/0184653 | A1* | 8/2006 | van Riel | 709/222 |
| 2008/0271017 | A1* | 10/2008 | Herington | 718/1 |
| 2009/0113423 | A1* | 4/2009 | Hiltgen et al. | 718/1 |
| 2009/0260007 | A1* | 10/2009 | Beaty et al. | 718/1 |
| 2010/0235831 | A1* | 9/2010 | Dittmer | 718/1 |
| 2012/0066677 | A1* | 3/2012 | Tang | 718/1 |

* cited by examiner

*Primary Examiner* — Emerson Puente
*Assistant Examiner* — Sisley Kim
(74) *Attorney, Agent, or Firm* — Lowenstein Sandler LLP

(57) ABSTRACT

A computing device receives a command to start a virtual machine, the virtual machine having a read-only layer and a copy-on-write (COW) layer. The computing device accesses the COW layer of the virtual machine from a network storage. The computing device determines whether the read-only layer of the virtual machine is cached in a local storage. Upon determining that the read-only layer of the virtual machine is cached in the local storage, the computing device starts the virtual machine based on a combination of the downloaded COW layer and the cached read-only layer of the virtual machine.

18 Claims, 5 Drawing Sheets

HOST MACHINE LEVEL TEMPLATE CACHING IN VIRTUALIZATION ENVIRONMENTS

TECHNICAL FIELD

Embodiments of the present invention relate generally to virtual machines. More particularly, embodiments of the present invention relate to techniques for starting virtual machines from a combination of files and/or other data/devices, some of which are locally cached and some of which are stored in network storage.

BACKGROUND

In enterprise systems, system data needs to have redundancy, high availability, and off-site replication. Therefore, a shared network storage that has integrated redundancy and high availability is typically used to store system data. This shared network storage is accessed by many separate machines, each of which reads and writes to the shared network storage. The separate machines may all access the same shared network storage, which provides cluster-level redundancy.

One type of system data that may be stored in the shared network storage is a disk image that includes a virtual machine. Organizations that use virtual machines (VMs) such as virtual desktops for various users may have many virtual machines (e.g., on the order of 100,000 virtual machines) with disk images stored on the shared network storage. These virtual machines may be shut down during the weekend or at night to reduce energy expenditures. It is then common for many users to attempt to start virtual machines at around the same time (e.g., at 9:00 AM when the workday begins). When multiple machines access the shared network storage to start VMs at the same time, this can cause an increased load on the shared network storage, and on the network pathways to the shared network storage. This may increase an amount of time that users have to wait for the virtual machines to be started. In some situations, VMs may even fail to load properly if too many users request VMs at the same time.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for starting virtual machines from disk images stored in network storage on hosts using a minimum of network bandwidth are described. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

According to one embodiment of the present invention, a computing device receives a command to start a virtual machine, the virtual machine having a read-only layer and a copy-on-write (COW) layer. In one embodiment, the read-only layer and the COW layer are separate files/devices that together comprise a disk image for the virtual machine. The computing device accesses the COW layer of the virtual machine from a network storage. The computing device determines whether the read-only layer of the virtual machine is cached in local storage. Upon determining that the read-only layer of the virtual machine is cached in the local storage, the computing device starts the virtual machine based on a combination of the remotely accessed COW layer and the cached read-only layer of the virtual machine. Upon determining that the read-only layer is not cached, the computing device remotely accesses the read-only layer and caches the read-only layer (copies it locally).

Dividing virtual machines (e.g., virtual machine images) into a copy-on-write layer and one or more read-only layers enables different portions of the virtual machines to be stored on different types of storage. This can improve performance of the virtual machines with minimal additional cost, and without sacrificing redundancy or availability. For example, read-only layers containing most of the information for a virtual machine can be cached locally on high performance storage that is not highly available, and an original copy and copy-on-write layer can be stored in low end network storage that is highly available to provide improved performance at relatively low cost. Additionally, by caching he read-only portions on local caches, the resource utilization of a network storage that stores the virtual machines may be reduced. This may significantly improve load times for virtual machines, especially at times of high demand.

Figure 1:
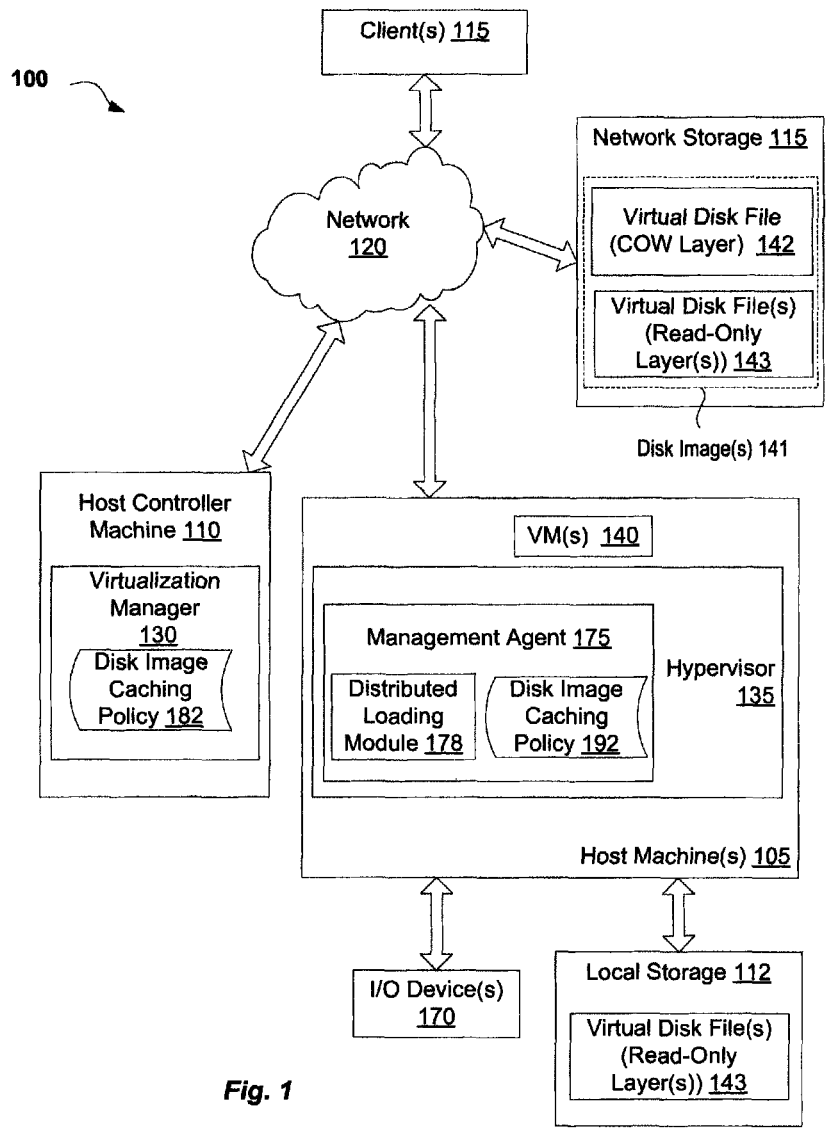
FIG. 1 is a block diagram illustrating an example of a network configuration according to one embodiment of the invention.

FIG. 1 is a block diagram illustrating an example of a network configuration 100 according to one embodiment of the invention. Network configuration 100 includes, but is not limited to, one or more clients 115 coupled to a host controller machine 110 and/or a host machine or machines 105 via a network 120. Network 120 may be a private network (e.g., a local area network (LAN) or a wide area network (WAN)), a public network (e.g., the Internet), or a combination of one or more networks.

Each host machine 105 may be a computing device configured to host virtual machines. The host machine 105 may be a personal computer (PC), server computer, mainframe, or other computing system. The host machine 105 may have a bare platform hardware that can include a processor, memory, input/output devices, etc. The host machine 105 may be a single machine or multiple host machines arranged in a cluster.

Host machine 105 includes a hypervisor 135 (also known as a virtual machine monitor (VMM)). The hypervisor 135, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. In one embodiment, the hypervisor 135 is run directly on bare platform hardware. In another embodiment, the hypervisor 135 is run on top of a host OS. Alternatively, for example, the hypervisor 135 may be run within, or on top of, another hypervisor. Hypervisors 135 may be implemented, for example, in hardware, software, firmware or by a combination of various techniques. The hypervisor 135 presents to other software (i.e., "guest" software) the abstraction of one or more virtual machines (VMs) 140, which may provide the same or different abstractions to various guest software (e.g., guest operating system, guest applications, etc.).

A virtual machine 140 is a combination of guest software that uses an underlying emulation of a hardware machine (e.g., as provided by a hypervisor). The guest software may include a guest operating system, guest applications, guest device drivers, etc. Virtual machines 140 can be, for example, hardware emulation, full virtualization, para-virtualization, and operating system-level virtualization virtual machines. Each virtual machine 140 includes a guest operating system (guest OS) that hosts one or more applications within the virtual machine. The guest OSes running on the virtual machines 140 can be of the same or different types (e.g., all may be Windows operating systems, or some may be Windows operating systems and the others may be Linux operating systems). Moreover, the guest OSes and the host OS may share the same operating system type, or the host OS may be a different type of OS than one or more guest OSes. For example, a guest OS may be a Windows operating system from Microsoft and a host OS may be a Linux operating system available from Red Hat.

In one embodiment, each virtual machine 140 hosts or maintains a desktop environment providing virtual desktops for remote clients (e.g., client 115) and/or local clients (e.g., that use attached input/output devices 170). A virtual desktop is a virtualized desktop computer, and thus may include storage, an operating system, applications installed on the operating system (e.g., word processing applications, spreadsheet applications, email applications, etc), and so on. However, rather than these functions being provided and performed at the client 115, they are instead provided and performed by a virtual machine 140. A virtual desktop can represent an output (e.g., an image to be displayed) generated by a desktop application running within a virtual machine. Graphics data associated with the virtual desktop can be captured and transmitted to a client 115, where the virtual desktop may be rendered by a rendering agent and presented by a client application (not shown).

In other embodiments, virtual machines 140 are not virtual desktops. For example, some or all of the virtual machines 140 may host or maintain a virtual server that can serve applications and/or information to remote clients. In contrast to a virtual desktop, a virtual server is a virtualized server computer, and thus may include storage, an operating system, an application server, and/or other server resources.

In one embodiment, hypervisor 135 includes a management agent 175. Management agent 175 may control the starting (e.g., loading) and stopping (e.g., shutting down or suspending) of VMs 140. The management agent 175 loads a VM 140 from a disk image 141. In one embodiment, the management agent 175 includes a distributed loading module 178 that loads the disk image 141 from both network storage 115 and a local storage 112.

A disk image is a file or collection of files that is interpreted by hypervisor 135 as a hard disk. A disk image may include a directory structure, files, etc. The disk image may encapsulate a virtual machine, which may include an OS and/or installed applications. A virtual machine can have multiple images, and each of these images can be split into read-only layers and COW layers. The management agent 175 may load the VM 140 by mounting the disk image 141 (or multiple disk images) and starting an OS included in the disk image or disk images.

Some virtual machines 140 may have been generated from a virtual machine template. The virtual machine template is a point-in-time (PIT) copy (e.g., a snapshot) of a generic virtual machine that may include one or more of base hard drive files, an operating system, base applications installed on the virtual machine, etc. This PIT copy contains data that changes rarely or not at all. Therefore, by caching the template access to this data can be performed locally instead of remotely. Virtual machines generated from a virtual machine template may include all of the properties (e.g., files, applications, file structure, operating system, etc.) of the virtual machine template when they are first created. These properties may be stored in virtual disk data (e.g., a virtual disk file 143) that is used as a base read-only layer for the virtual machine 140. Note that the term "virtual disk file" is used to herein refer to virtual disk data for the sake of simplicity and clarity. However, it should be understood that virtual disk data is not limited to files. Therefore, it should be understood that where the term "virtual disk file" is used, other data arrangements may also be implemented.

Once the virtual machine 140 has been assigned to a user, COW layer 142 is created on top of the template, and that user may make changes to the virtual machine, such as installing new applications, adding files, deleting files, uninstalling applications, and so on. These changes are stored in the COW layer 142 which contains only the differences from the base read-only layer 143. the COW layer 142 and the read-only virtual disk file 143 together form a disk image 141. In one embodiment, the virtual disk file 143, taken by itself, is a disk image of the VM template.

Host machine 105 is connected with a network storage 115 via network 120 or via a separate network dedicated solely to storage connections (not shown). Network storage 115 may be a block-level device (e.g., a storage area network (SAN) device), a file-level device (e.g., a network attached storage (NAS) device, NFS etc), or a combination of both. The network storage 115 may include multiple different storage domains and/or targets, which may each have different geographic locations and which may be managed by different servers (e.g., by different host machines).

Disk images 141 are stored in network storage 115. The disk images 141 may be stored in multiple different storage machines of the network storage 115, each of which may be managed by different host machines 105. Additionally, the disk images 141 may be stored on different storage networks. The copy of the disk image 141 stored in the network storage 115 is a definitive up-to-date copy for the virtual machine 140. Accordingly, in one embodiment, whenever VM 140 is to be started, the host machine 105 that will host the VM 140 accesses the network storage 115 to load the VM 140 from the disk image 141. However, if host machines 105 start many VMs at the same time, access to the network storage 115 may become limited. For example, available network bandwidth to the network storage 115 may become restricted, and available CPU resources and/or input/outputs per second (IOPS) resources for the network storage 115 may become limited.

To ameliorate or eliminate the problems that occur when many VMs are started at the same time, host machines 105 cache some or all of the virtual disk files 143 that include the read-only layers of the VM in local storage 112 (according to policy). Each host machine 105 has its own local storage 112, which may include internal and/or external storage devices such as hard drives, solid state drives or high end local storage such as fusion-IO®, DDRDrive®, ramdrives, etc. Note that the local storage 112 may be a file-level storage device or a block-level storage device, regardless of whether the network storage 115 is a block-level storage device or a file-level storage device. Each host machine 105 may cache the virtual disk files 143 that make up the read-only layer (or layers) of the VMs 140 that the host machine 105 previously hosted. Once a disk image (e.g., of a VM template) or a virtual disk file is completely copied to local storage 112, the virtual disk file/image may be marked as active. Therefore, the distributed loading module 178 may load the VM using the locally cached virtual disk file.

The distributed loading module 178 may load a VM 140 from a disk image 141 that is located on network storage 115, that is located on local storage 112, or that is distributed across local storage 112 and network storage 115. In one embodiment, when a host machine 105 is to start a VM 140, the distributed loading module 178 accesses the virtual disk file that includes the COW layer for that VM 140 from the network storage 115. The distributed loading module 178 may then attempt to access the virtual disk file or files that include one or more read-only layers 143 of the VM from local storage 112. In one embodiment, the COW layer includes links to one or more read-only layers. If a virtual disk file 143 including a read-only layer of the VM is not cached in the local storage 112, the host machine accesses that virtual disk file 143 from the network storage 115.

Since the virtual disk file 143 that includes the read-only layers never changes, those virtual disk files can be cached in the local storage 112 without causing any problems with disk image synchronization. Additionally, since a copy of the read-only layer is stored in the network storage, the read-only layer also has high availability and redundancy. The base read-only layer 143 of the disk image 141, which may itself be a disk image for a VM template, comprises most of the data included in disk image 141. In one embodiment, the base read-only layer 143 is an order of magnitude (or more) larger than the COW layer 142. In one embodiment, VM templates are cached in the local storage 112 for each of the host machines 105. Accordingly, the amount of network resources and network storage resources needed to start a VM 140 may be considerably reduced by caching the read-only layers of the VM image (e.g., the virtual disk files 143 including the read-only layers) on the local storage 112. Additionally, caching the read-only layer may improve performance and speed up loading times.

If a particular host machine 105 crashes, any other host machine 105 can still start up the VMs 140 that were hosted by that particular host machine using the copy of the disk images 141 stored in the network storage 115. No data is lost due to a system crash of a host machine 105.

In one embodiment, users access virtual machines 140 remotely via clients 115. Alternatively, users may access virtual machines 140 locally via terminals and/or input/output devices 170 such as a mouse, keyboard and monitor. In one embodiment, virtual machines 140 communicate with clients 115 using a multichannel protocol (e.g., Remote Desktop Protocol (RDP), Simple Protocol for Independent Computing Environments (SPICE™ from Red Hat), etc.) that allows for connection between the virtual machine and end-user devices of the client via individual channels.

Each client 115 may be a personal computer (PC), server computers, notebook computers, tablet computers, palm-sized computing device, personal digital assistant (PDA), etc. Clients 115 may be fat clients (clients that perform local processing and data storage), thin clients (clients that perform minimal or no local processing and minimal to no data storage), and/or hybrid clients (clients that perform local processing but little to no data storage). In one embodiment, clients 115 essentially act as input/output devices, in which a user can view a desktop environment provided by a virtual machine 140 (e.g., a virtual desktop) on a monitor, and interact with the desktop environment via a keyboard, mouse, microphone, etc. In one embodiment, a majority of the processing is not performed at the clients 115, and is instead performed by virtual machines 140 hosted by the host machine 105.

The host machine 105 may be coupled to a host controller machine 110 (via network 120 as shown or directly). The host controller machine 110 may monitor and control one or more functions of host machines 105. In one embodiment, the host controller machine 110 includes a virtualization manager 130 that manages virtual machines 140. The virtualization manager 130 may manage one or more of provisioning of new virtual machines, connection protocols between clients and virtual machines, user sessions (e.g., user authentication and verification, etc.), backup and restore, image management, virtual machine migration, load balancing, VM caching (e.g., of read-only layers for VM images), and so on. Virtualization manager 130 may, for example, add a virtual machine, delete a virtual machine, balance the load on a host machine cluster, provide directory services to the virtual machines 140, and/or perform other management functions. The virtualization manager 130 in one embodiment acts as a front end for the host machines 105. Thus, clients 115 and/or I/O devices 170 log in to the virtualization manager 130, and after successful login the virtualization manager 130 connects the clients or I/O devices 170 to virtual machines 140. This may include directing the host machine 105 to load a VM 140 for the client 115 or I/O device 170 to connect to. In another embodiment, clients 115 and/or I/O devices 170 directly access host machines 105 without going through virtualization manager 130.

In one embodiment, the virtualization manager 130 includes one or more disk image caching policies 182. The disk image caching policies 182 specify disk images and/or virtual disk files to cache in local storage 112. In one embodiment, the disk image caching policy 182 specifies that VM templates are to be cached in local storage 112. disk images frequently have a base read-only layer that is a copy of a VM template. Therefore, such caching of VM templates enables the majority of data in a disk image to be accessed locally without taxing the network resources or network storage resources. In another embodiment, the disk image caching policy 182 specifies that each time a host machine hosts a VM that is not locally cached, the host machine is to cache all read-only layers of the disk image for the VM in local storage. Other disk image caching policies 182 are also possible.

In one embodiment, in addition or instead of the virtualization manager 130 including a disk image caching policy 182, management agent 175 includes a disk image caching policy 192. disk image caching policy 192 may be a local policy that applies to a specific host machine. Therefore, each management agent 175 may apply different disk image caching policies 192. In one embodiment, if virtualization manager 130 includes disk image caching policy 182 and management agent 175 includes disk image caching policy 192, disk image caching policy 192 overrides disk image caching policy 182 where there are conflicts. Alternatively, disk image caching policy 182 may override disk image caching policy 192.

Figure 2:
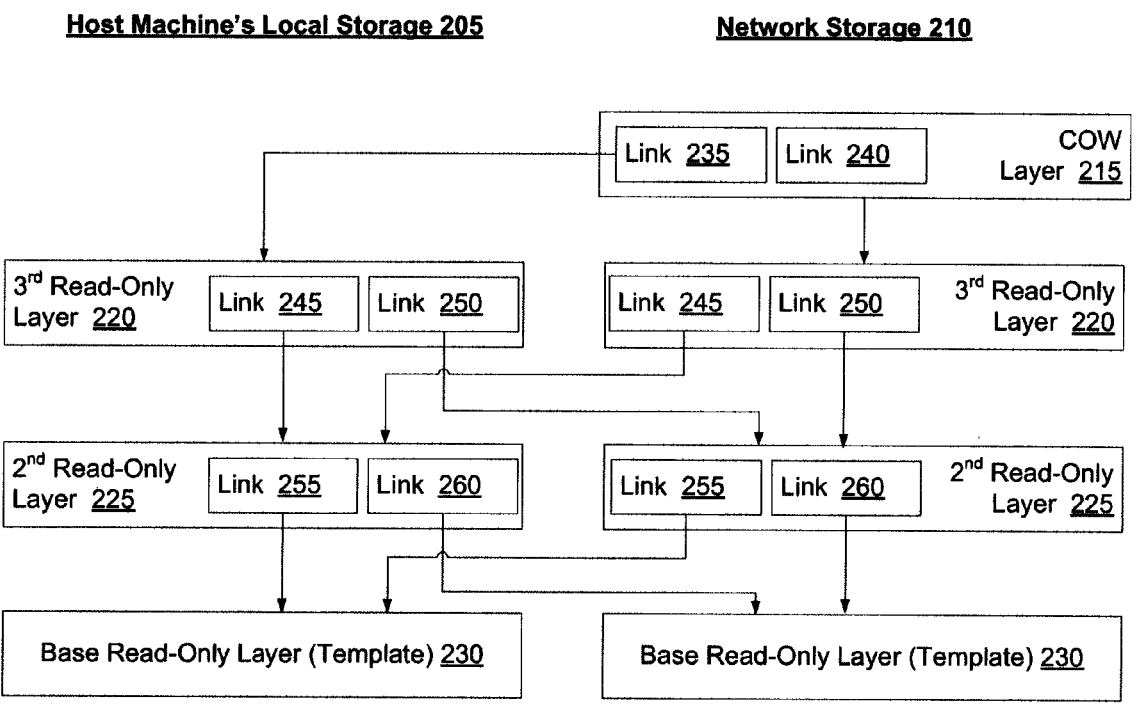
FIG. 2 is a block diagram illustrating the structure of a disk image, in accordance with one embodiment of the present invention.

FIG. 2 is a block diagram illustrating the structure of a disk image 200 for a virtual machine, in accordance with one embodiment of the present invention. The example disk image 200 includes a COW layer 215 and three read-only layers 220, 225, 230, each of which is a different virtual disk file.

When originally created, the VM 200 included a base read-only layer (generated from a VM template) and a COW layer. Each time a new point-in-time copy of the VM was created, a new read-only layer was created from the former COW layer and a new COW layer was created.

At any point the user may generate a new point-in-time copy (e.g., snapshot) of the virtual machine 140. Generating the new point-in-time copy of the virtual machine causes the COW layer 142 to become a read-only layer that can no longer be altered. A new COW layer is then generated. Any new modifications to the virtual machine are recorded as differences from the latest read-only layer. In one embodiment, the COW layer includes a link to a top read-only layer. The top read-only layer in turn includes a link to a previous read-only layer, which includes a link to a previous read-only layer, and so on. The next to bottom read-only layer includes a link to the base read-only layer 143. In one embodiment, the COW layer includes a separate link to all lower layers.

The COW layer 215 is the top layer of the VM image 200. In one embodiment, the COW layer 215 includes two links 235, 240. Each link 235, 240 is a preconfigured path to a storage location. The links are used to locate the next read-only layer (the next virtual disk file) of the disk image. In one embodiment, links to the next lower layer are included at the beginning of a current layer. Link 235 links to a location in host machine's local storage 205 to search for a top read-only layer (3rd read-only layer 220) of the VM image 200. Link 240 links to a second location 220 in the network storage 210 where the 3rd read-only layer is also located. Note that each of the links may be dynamic links, and may automatically be updated as the locations of read-only layers change (e.g., as a read-only layer is copied to a local cache).

After accessing the COW layer 215 on the network storage 210, the host machine may attempt to access the 3rd read-only layer 220 on the local storage 205. If the 3rd read-only layer is not found on the local storage 205, it is accessed from the network storage 210. In one embodiment, the link is automatically updated so that it automatically points to the correct location at which the 3rd read only layer can be found.

The 3rd read-only layer 220 includes link 245 to 2nd read-only layer in the host machine's local storage 205 and link 250 to 2nd read-only layer 225 in the network storage 210. The host machine first attempts to access the 2nd read-only layer 205 from the local storage 205. If the host machine is unsuccessful in accessing the 2nd read-only layer 225 from the local storage 205, it accesses the 2nd read-only layer 225 from the network storage.

The 2nd read-only layer 225 includes link 255 to the base read-only layer 230 on the local storage 205 and link 260 to the base read-only layer 230 on the network storage 210. The host machine first attempts to access the base read-only layer 230 from the local storage 205. If the host machine is unsuccessful in accessing the base read-only layer 230 from the local storage 205, it accesses the base read-only layer 230 from the network storage.

Once all of the layers of the layers for the disk image are accessed, a disk image formed from the combination of layers is mounted and the VM is started.

Figure 3:
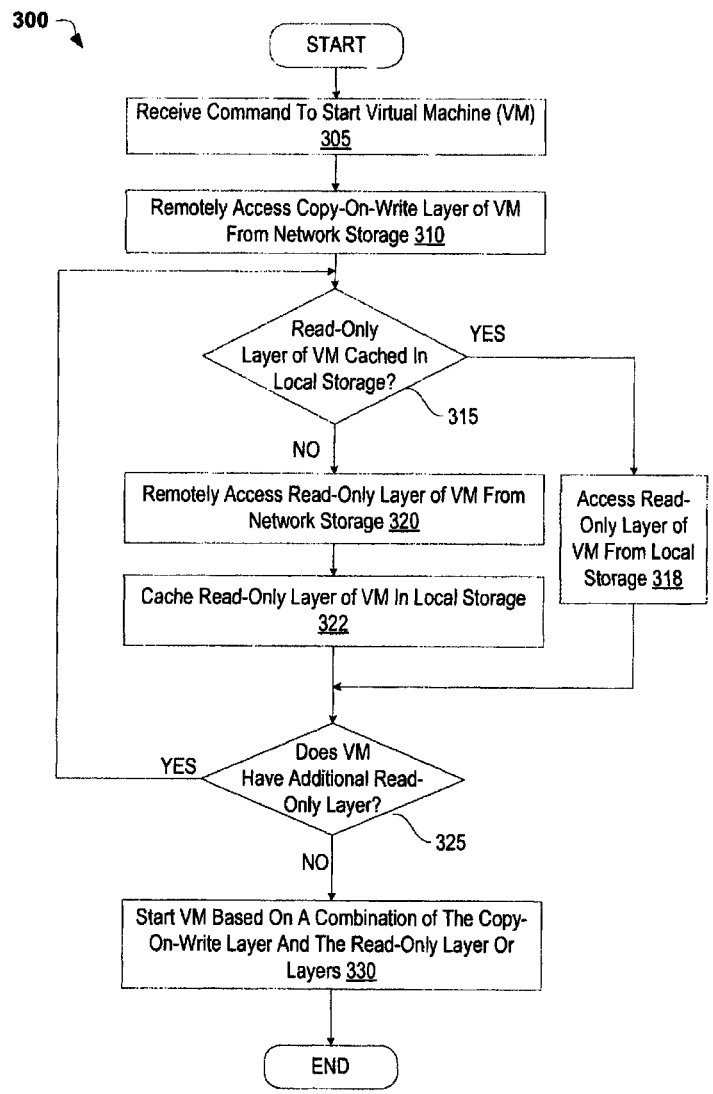
FIG. 3 is a flow diagram illustrating one embodiment for a method of starting a VM from a copy-on-write (COW) layer of a virtual machine stored at a network storage and a read-only layer of the virtual machine cached at a local storage.

FIG. 3 is a flow diagram illustrating one embodiment for a method 300 of starting a VM from a COW layer of a VM stored at a network storage and a read-only layer of the VM cached at a local storage. Method 300 may be performed by processing logic that may comprise hardware (circuitry, dedicated logic, etc.), software (such as is run on a general purpose computer system or a dedicated machine), or a combination of both. In one embodiment, the method 300 is performed by host controller machine 110, as depicted in FIG. 1.

At block 305 of method 300, processing logic (e.g., a management agent running on a host machine) receives a command to start a VM. The command may be received from a client, an input/output device connected with a host machine, or a virtualization manager running on a host controller machine.

At block 310, the processing logic remotely accesses a COW layer of the VM from network storage. The COW layer may be embodied in a first virtual disk file. At block 315, the processing logic determines whether a read-only layer of the VM is cached in local storage of the host machine. The read-only layer may be embodied in a second virtual disk file. If the read-only layer of the VM is cached in the local storage, the method continues to block 318. If the read-only layer of the VM is not cached in the local storage, the method proceeds to block 320.

At block 320, the processing logic remotely accesses the read-only layer of the VM. At block 322, the processing logic caches the read-only layer of the VM in the local storage. In one embodiment, once the VM is started from a remote read-only layer, processing logic will not use a local copy of the read-only layer even if a link to the read-only layer is changed unless the hypervisor is instructed to close the virtual disk file and reopen it from local storage.

At block 318, the processing logic accesses the read-only layer of the VM from the local storage. The method then proceeds to block 325.

At block 325, the processing logic determines whether the VM has any additional read-only layers. If the VM does have an additional read-only layer, the method returns to block 315, and determines whether the additional read-only layer is cached in local storage of the host machine. If the VM does not have an additional read-only layer, the method proceeds to block 330. The read-only layer and COW layer (or layers) may together form a disk image. At block 330, the VM is started based on a combination of the COW layer and the read-only layer or read-only layers. The method then ends.

Figure 4:
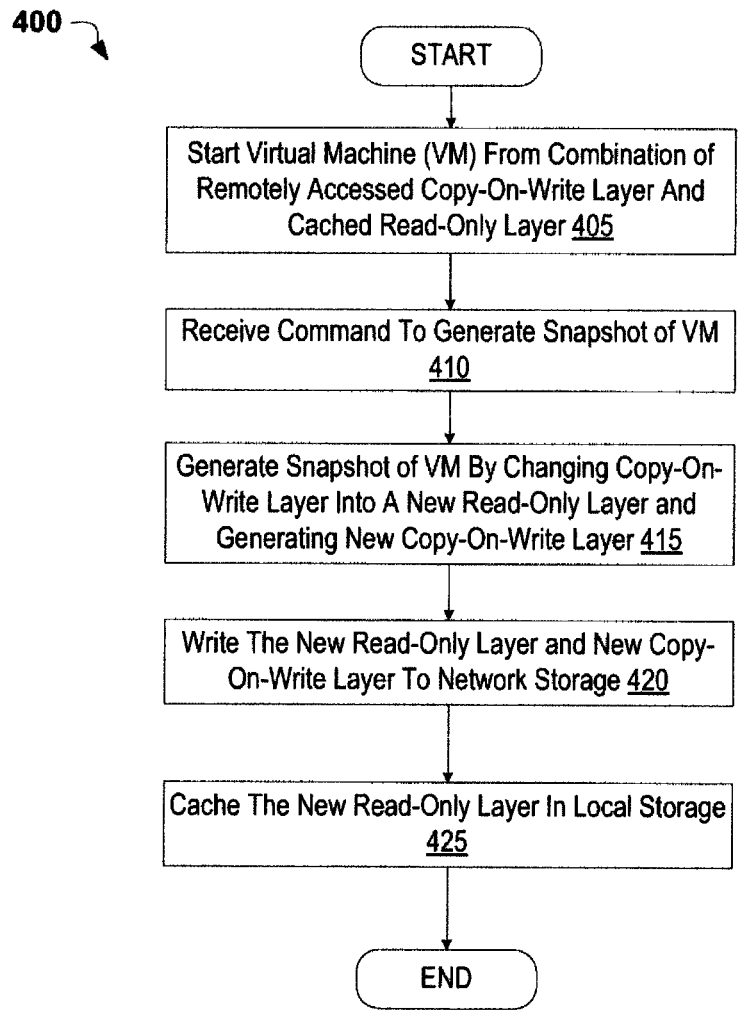
FIG. 4 is a flow diagram illustrating one embodiment for a method of generating a snapshot of a virtual machine.

FIG. 4 is a flow diagram illustrating one embodiment for a method 400 of generating a snapshot of a virtual machine. Method 400 may be performed by processing logic that may comprise hardware (circuitry, dedicated logic, etc.), software (such as is run on a general purpose computer system or a dedicated machine), or a combination of both. In one embodiment, method 400 is performed by host controller machine 110, as depicted in FIG. 1. In another embodiment, method 400 is performed by a host machine 105, as depicted in FIG. 1. Alternatively, method 400 may be performed by a combination of a host controller machine 110 and a host machine 105.

At block 405 of method 400, processing logic (e.g., a management agent running on a host machine) starts a VM from a combination of a remotely accessed COW layer and a cached read-only layer of the VM. At block 410, the processing logic receives a command to generate a snapshot of the VM. The command may be received from a host controller machine (e.g., from a virtualization manager running on a host controller) or from a user (e.g., via a client machine or an I/O device). The host machine may command the processing logic to generate the snapshots on a periodic basis (e.g., every 15 minutes, every hour, etc.) or when some specific snapshotting criteria are satisfied (e.g., when a threshold amount of changes have been made to the VM).

At block 415, the processing logic generates a snapshot of the VM by changing the COW layer into a new read-only layer and generating a new COW layer of the VM. At block 420, the processing logic writes the new read-only layer and the new COW layer to network storage. At block 425, the processing logic caches the new read-only layer of the VM in local storage. The method then ends.

Figure 5:
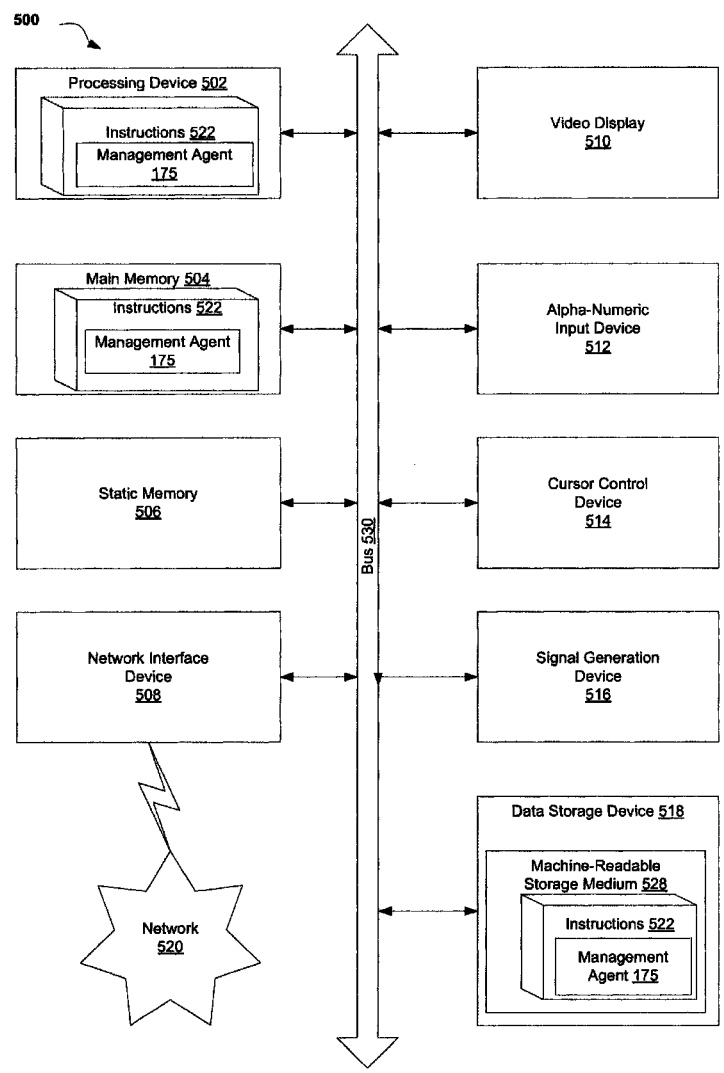
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or ore sets of instructions or software 522 embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media.

The machine-readable storage medium 528 may also be used to store instructions for a management agent (e.g., management agent 175 of FIG. 1) and/or a software library containing methods that call a management agent. Alternatively, machine-readable storage medium 528 may be used to store instructions for a virtualization manager (e.g., virtualization manager 130 of FIG. 1) and/or a software library containing methods that call a virtualization manager. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, techniques for maintaining a VM pool cache have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "initiating" or "identifying" or "loading" or "determining" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising: receiving a command to start a virtual machine, the virtual machine having a read-only layer and a copy-on-write (COW) layer;
   remotely accessing the COW layer of the virtual machine from a network storage;
   determining whether the read-only layer of the virtual machine is cached in a local storage;
   upon determining that the read-only layer of the virtual machine is cached in the local storage, starting, by a processing device, the virtual machine in view of a combination of the remotely accessed COW layer and the cached read-only layer of the virtual machine, wherein the COW layer comprises a first link to check for the read-only layer stored in the local storage and a second link to a copy of the read-only layer stored in the network storage, and wherein the read-only layer comprises a third link to check for one of an additional read-only layer or a base read-only layer stored in the local storage and a forth link to check for one of a copy of the additional read-only layer or a copy of the base read-only layer stored in the network storage; and
   in response to receiving a command to generate a point-in-time copy of the virtual machine in view of exceeding a threshold amount of changes, designating the COW layer as a new read-only layer and generating a new COW layer that links to the new read-only layer in the local storage and the new read-only layer in the network storage.

2. The method of claim 1, wherein the read-only layer comprises a base read-only layer that is a virtual machine template.

3. The method of claim 2, wherein the read-only layer further comprises one or more additional read-only layers, each of which was previously a COW layer.

4. The method of claim 2, wherein the virtual machine template comprises a point-in-time copy of a base virtual machine that comprises hard drive files, an operating system and installed applications.

5. The method of claim 1, wherein the virtual machine comprises a plurality of read-only layers, the method further comprising:
   for each of the plurality of read-only layers, determining whether the read-only layer is cached in the local storage;
   remotely accessing any of the each of the plurality of read-only layers that are not cached in the local storage;
   caching at least one of the remotely accessed read-only layers in the local storage; and
   starting the virtual machine in view of a combination of the remotely accessed COW layer and the plurality of read-only layers.

6. The method of claim 1, further comprising:
   using the first link to determine whether the read-only layer of the virtual machine is cached in the local storage; and
   using the second link to remotely access the read-only layer of the virtual machine from the network storage if the read-only layer is not cached in the local storage.

7. A non-transitory computer-readable medium comprising instructions that, when executed by a processing device, cause the processing device to:
   receive a command to start a virtual machine, the virtual machine having a read-only layer and a copy-on-write (COW) layer;
   remotely access the COW layer of the virtual machine from a network storage;
   determine whether the read-only layer of the virtual machine is cached in a local storage;
   upon determining that the read-only layer of the virtual machine is cached in the local storage, start by the processing device, the virtual machine in view of a combination of the remotely accessed COW layer and the cached read-only layer of the virtual machine, wherein the COW layer comprises a first link to check for the read-only layer stored in the local storage and a second link to a copy of the read-only layer stored in the network storage, and wherein the read-only layer comprises a third link to check for one of an additional read-only layer or a base read-only layer stored in the local storage and a forth link to check for one of a copy of the additional read-only layer or a copy of the base read-only layer stored in the network storage; and
   in response to receiving a command to generate a point-in-time copy of the virtual machine in view of exceeding a threshold amount of changes, designate the COW layer as a new read-only layer and generating a new COW layer that links to the new read-only layer in the local storage and the new read-only layer in the network storage.

8. The non-transitory computer-readable medium of claim 7, wherein the read-only layer comprises a base read-only layer that is a virtual machine template.

9. The non-transitory computer-readable medium of claim 8, wherein the read-only layer further comprises one or more additional read-only layers, each of which was previously a COW layer.

10. The non-transitory computer-readable medium of claim 8, wherein the virtual machine template comprises a point-in-time copy of a base virtual machine that comprises hard drive files, an operating system and installed applications.

11. The non-transitory computer-readable medium of claim 7, wherein the virtual machine comprises a plurality of read-only layers, the processing device is further to:
    for each of the plurality of read-only layers, determine whether the read-only layer is cached in the local storage;
    remotely access any of the each of the plurality of read-only layers that are not cached in the local storage;
    cache at least one of the remotely accessed read-only layers in the local storage; and
    start the virtual machine in view of a combination of the remotely accessed COW layer and the plurality of read-only layers.

12. The non-transitory computer-readable medium of claim 7, wherein the processing device is further to:
    use the first link to determine whether the read-only layer of the virtual machine is cached in the local storage; and
    use the second link to remotely access the read-only layer of the virtual machine from the network storage if the read-only layer is not cached in the local storage.

13. A system, comprising: a host machine having a memory to store instructions; and a processing device operatively coupled to the memory to execute the instructions, wherein the instructions cause the processing device to:
    receive a command to start a virtual machine, the virtual machine having a read-only layer and a copy-on-write (COW) layer;
    remotely access the COW layer of the virtual machine from a network storage;

determine whether the read-only layer of the virtual machine is cached in a local storage;

upon determining that the read-only layer of the virtual machine is cached in the local storage, start by the processing device, the virtual machine in view of a combination of the remotely accessed COW layer and the cached read-only layer of the virtual machine, wherein the COW layer comprises a first link to check for the read-only layer stored in the local storage and a second link to a copy of the read-only layer stored in the network storage, and wherein the read-only layer comprises a third link to check for one of an additional read-only layer or a base read-only layer stored in the local storage and a forth link to check for one of a copy of the additional read-only layer or a copy of the base read-only layer stored in the network storage; and in response to receiving a command to generate a point-in-time copy of the virtual machine in view of exceeding a threshold amount of changes, designate the COW layer as a new read-only layer and generating a new COW layer that links to the new read-only layer in the local storage and the new read-only layer in the network storage.

14. The system of claim 13, wherein the read-only layer comprises a base read-only layer that is a virtual machine template.

15. The system of claim 14, wherein the read-only layer further comprises one or more additional read-only layers, each of which was previously a COW layer.

16. The system of claim 14, wherein the virtual machine template comprises a point-in-time copy of a base virtual machine that comprises hard drive files, an operating system and installed applications.

17. The system of claim 13, wherein the virtual machine comprises a plurality of read-only layers, and wherein the instructions further cause the processing device to:
  determine, for each of the plurality of read-only layers, whether the read-only layer is cached in the local storage;
  remotely access any of the each of the plurality of read-only layers that are not cached in the local storage;
  cache at least one of the remotely accessed read-only layers in the local storage; and
  start the virtual machine in view of a combination of the remotely accessed COW layer and the plurality of read-only layers.

18. The system of claim 13, wherein the instructions further cause the processing device to:
  use the first link to determine whether the read-only layer of the virtual machine is cached in the local storage; and
  use the second link to remotely access the read-only layer of the virtual machine from the network storage if the read-only layer is not cached in the local storage.

* * * * *